United States Patent [19]

Whited

[11] 3,788,719

[45] Jan. 29, 1974

[54] TAPE STAGING BINS FOR DATA CENTER

[75] Inventor: D. E. Whited, Houston, Tex.

[73] Assignee: Shell Oil Company, Houston, Tex.

[22] Filed: July 18, 1972

[21] Appl. No.: 272,834

[52] U.S. Cl. .................. 312/198, 312/123, 312/212, 312/283, 312/326, 312/327

[51] Int. Cl. ............................................. A47b 53/00

[58] Field of Search ... 312/10, 13, 14, 20, 123, 283, 312/211, 212, 198, 201, 326–329

[56] References Cited

UNITED STATES PATENTS

| | | | |
|---|---|---|---|
| 1,245,022 | 10/1917 | Piggot | 312/212 X |
| 1,219,367 | 3/1917 | Adams | 312/123 |
| 1,054,311 | 2/1913 | Phillips | 312/123 |
| 2,523,762 | 9/1950 | Howard | 312/327 UX |

*Primary Examiner*—James C. Mitchell
*Attorney, Agent, or Firm*—Theodore E. Bieber

[57] ABSTRACT

A plurality of staging bins particularly adapted for use with magnetic computer tapes and disks wherein the tapes and disks are normally stored in a library and dispensed in response to a request. The staging bins comprise a plurality of bins pivoted at their lower edge for tape and pivoted on their side edge for disk and open on the side facing the library whereby an operator may open the bin and obtain tapes and disks placed in the bin by the librarian. The bins also include means for locking the bins when the library is unattended.

10 Claims, 7 Drawing Figures

TAPE STAGING BINS FOR DATA CENTER

BACKGROUND OF THE INVENTION

The present invention relates to tape and disk storage facilities and particularly to a library-type storage where computer tapes and disks are stored when not in use. It is a customary practice for the librarian to supply the tapes or disks as requested by the computer operators. Normally the tapes are placed in a portable carrier and dispensed from a counter or similar arrangement. While this procedure is normally satisfactory, it does not provide security for the library nor facilitate the access to tapes or disks when needed. In view of the large capital investment in most computer tape/disk libraries, the matter of security is of utmost importance. Since most libraries are relatively open areas, it is impossible for the librarian to close and lock the library if the librarian leaves. If the librarian does secure the library upon departure, it means that no further tapes or disks can be issued. This, of course, limits the usefulness of the library. Further since the library is open there is little or no fire protection for the library.

BRIEF SUMMARY OF THE INVENTION

The present invention solves the above problems by providing dispensing bins where the librarian can place the required tapes or disks in the bin from the library side and the user can obtain the tapes or disks from the opposite side without having access to the library. More particularly, the staging bins for tapes comprise bin-type members which have a front and bottom wall and two end walls and are open on their top and back sides. Where the front and bottom walls join, they are hinged to suitable members positioned in the wall of the library. Thus the librarian can place the tapes in the open back side of the bins while the user can open the bins from the front side and remove the tapes. In addition, bins may be provided with suitable locking means so the librarian can selectively lock some of the bins while allowing the user to have access to the remaining bins. The staging bins for disks are identical to the tape bins except that the bin is mounted on its side and hinged vertically.

In addition, the staging bin can be formed as part of a wall of the library by positioning a plurality of upright post members along one wall of the library. The post members are joined together by a plurality of parallel-spaced, horizontal headers. The combination of the vertical posts and the horizontal headers form a plurality of rectangular openings in which the individual staging bins are positioned. Further, the staging bins can be hinged to the horizontal headers or the vertical posts. The remainder of the wall of the library can be completely enclosed. Thus the user only has access to the tapes or disks in the individual bins and not access to the complete library.

BRIEF DESCRIPTION OF THE DRAWINGS

The present invention will be more easily understood from the following detailed description of a preferred embodiment when taken in conjunction with the attached drawings in which.

Preferred Embodiment

Figure 1:
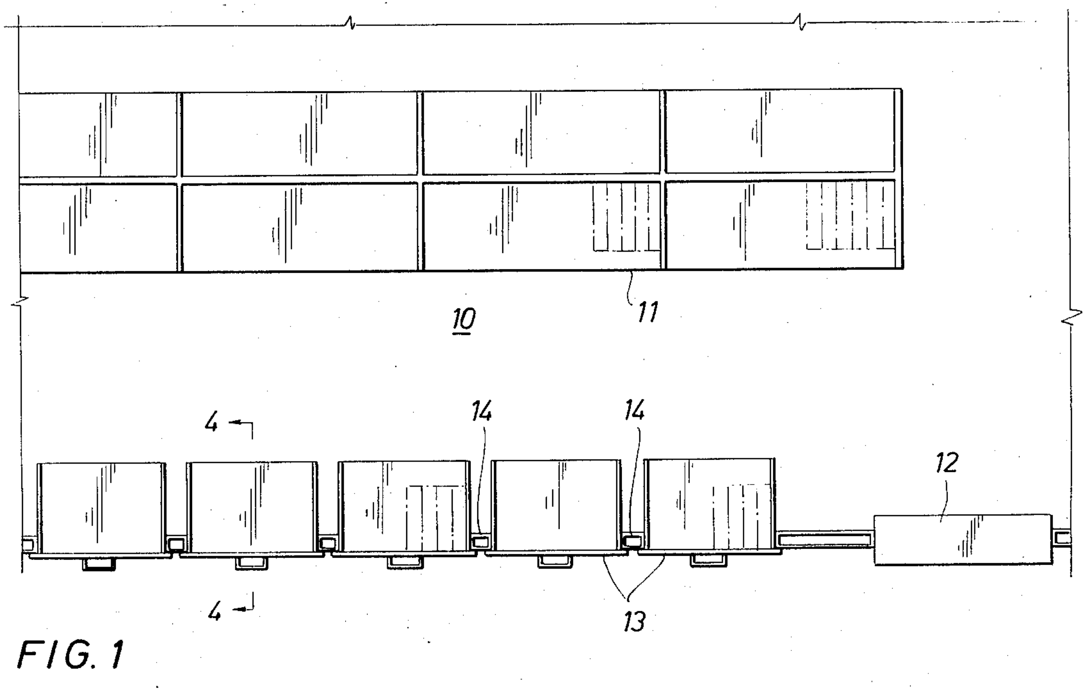
FIG. 1 is a plan view of a library.
Figure 2:
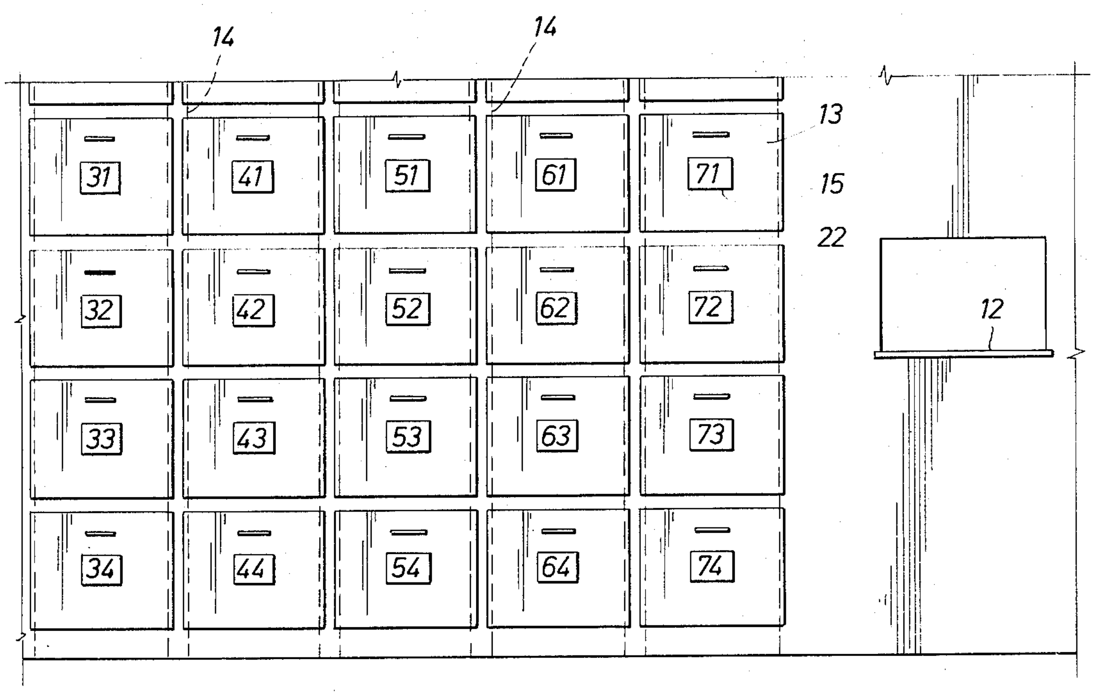
FIG. 2 is an elevation view of one wall of the library showing the staging bins of the present invention.

Referring now to FIGS. 1 and 2 there is shown the plan view and an elevation view of one wall of the library incorporating the staging bins of the present invention. More particularly, there is shown storage racks 11 on which the magnetic tapes or disks are stored. As is well known, the magnetic tapes are stored on reels and then placed in suitable containers that are usually placed on end on the storage racks. The front wall of the library is provided with a plurality of staging bins 13 constructed according to the present invention. The staging bins are manufactured in vertical units with each unit having a pair of vertical upright post members 14. The post members can be fastened to the ceiling and the floor of the library by suitable means not shown in the drawings. In addition, a plurality of parallel spaced headers 22 are provided for spacing the vertical post members. In addition the headers provide a support for the hinge element of the staging bins as described below. The individual staging bins are provided with a window 15 in which a suitable card may be placed identifying the tapes available in the staging bin. In addition the staging bins may be numbered so that the location of particular tapes may be indicated by the number of the staging bin. The front wall of the library may be provided with a small counter 12 through which requests for various tapes may be submitted.

Figure 3:
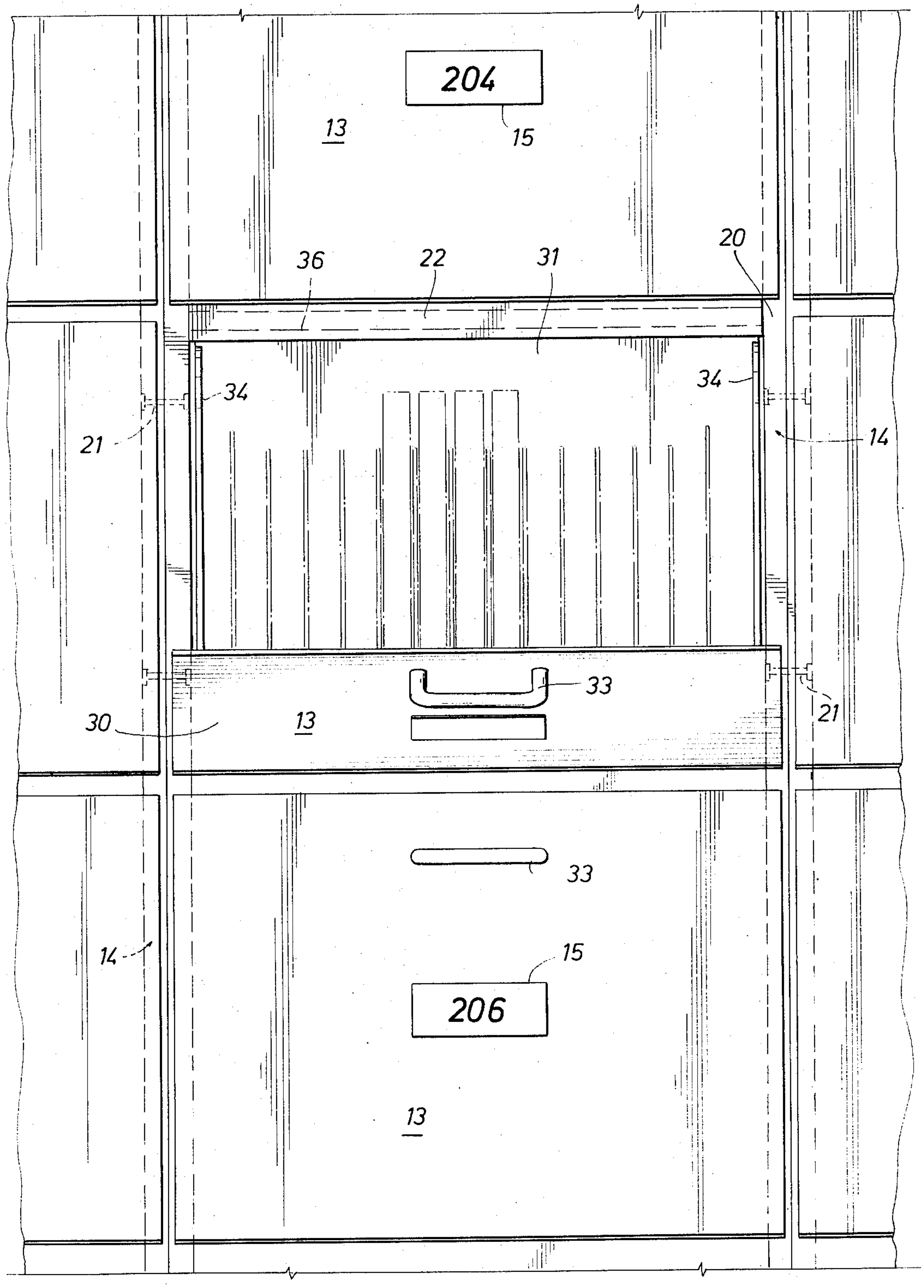
FIG. 3 is an enlarged elevation view of the staging bins for tapes horizontally hinged showing one of the bins in an open position.
Figures 4, 5:
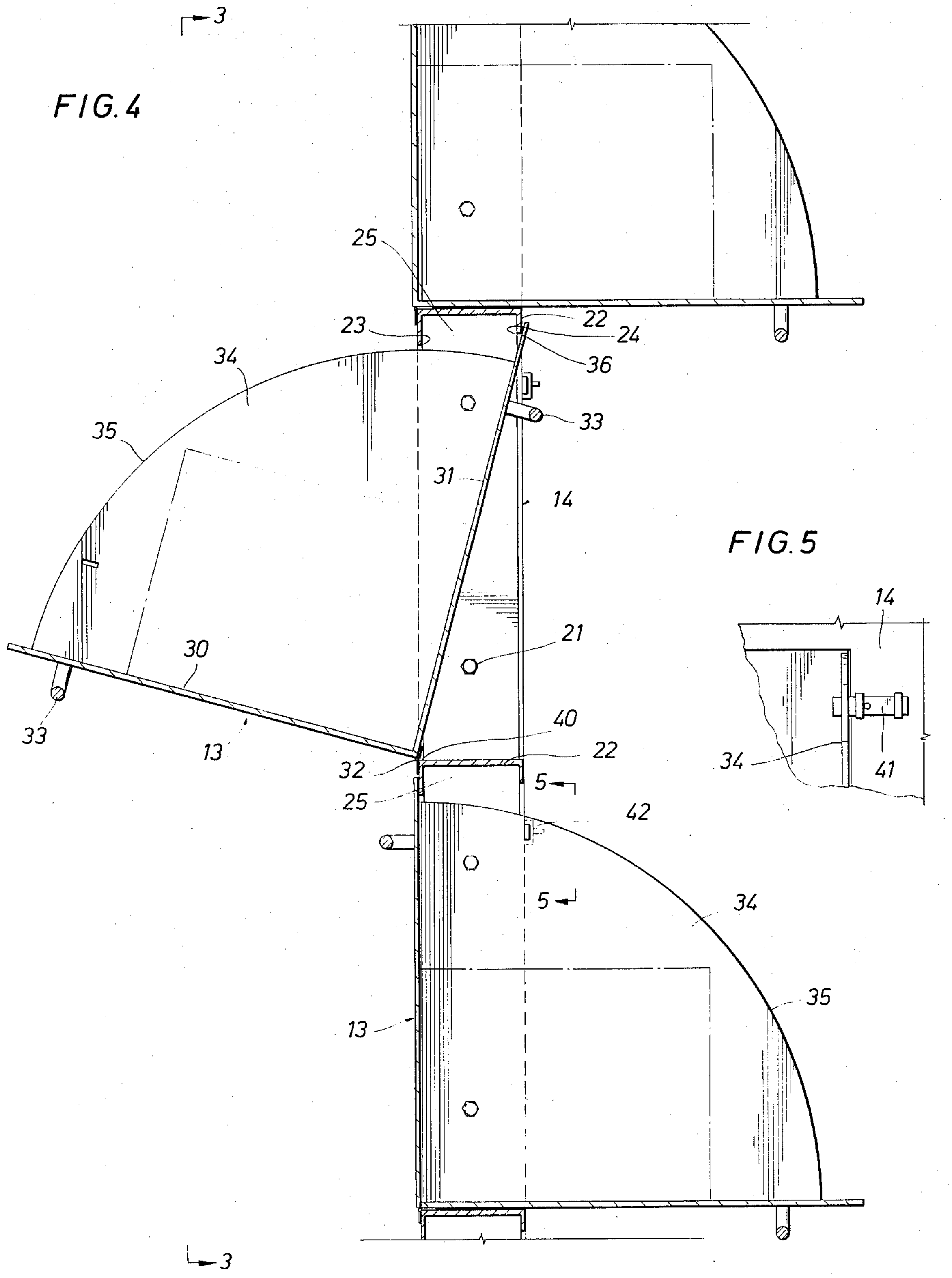
FIG. 4 is an end view of the staging bins for tapes shown in FIG. 3.
FIG. 5 is an enlarged view of the staging-bin locking mechanism.

Referring now to FIGS. 3 and 4 there is shown the detailed construction of the individual staging bins. As explained above, the vertical post members 14 are preferably formed from channel shaped members which are joined together by a plurality of parallel-spaced header members 22. The header members are also preferably channel-shaped members having their legs extending in a downward direction as shown in FIG. 4. The headers are joined to the vertical post members by suitable means, for example, welding. In addition, a portion of the front flange of the headers is removed, as shown at 23, to form a recess in which the lip or upper end of the staging bin may rest. Similarly, the rear edge of the flange is removed at 24 in order to form a recess for the end of the bottom of the staging bin and prevent the staging bin from falling completely when it is opened. A plurality of lateral stops 25 are spaced along the length of the header and serve to prevent the storage bins from falling too far forward as shown at the top of FIG. 4 or too far to the rear as shown at the bottom of FIG. 4.

The individual staging bins are formed from a front panel 30 and a bottom panel 31, which are joined at their adjacent edges 32. It would normally be more convenient to form the front and bottom panels from a single sheet of material which is bent along the axis 32. The front panel of the staging bin is provided with handles 33 while similar handle 33 is fixed to bottom panel of the staging bin. The handles provide a ready means by which the staging bin may be pivoted about the axis 32. The end walls 34 are attached to the front and bottom walls panels by suitable means, such as riveting, spot welding, or the like. The free edge of the end panels has an arcuate shape 35 so that the staging bin 33 may be pivoted around the axis 32 without the end panels interferring with the spacing member 22.

The staging bins are pivoted about the axis 32 by means of a hinge 40 which has one flap attached to the header 22 and the other flap attached to the bottom panel of the staging bin. Preferably the hinge 42 is of the continuous hinge type commonly referred to as a piano hinge.

The staging bins may also be provided with a locking means as shown in FIG. 5. The locking means comprises a latch member 41 which is mounted on the upright post members so that it may be moved axially beyond the edge of the post to engage a notch 42 formed in the end wall of the staging bin. Obviously other type locking mechanisms may be provided, including a system that would lock all of the staging bins simultaneously.

While the construction of the staging bins may vary they are preferably formed from sheet metal. In addition, the staging bins, vertical posts, headers and other members may be formed of material or insulated to form a fire wall. This would provide additional protection for the tape library.

Figure 6:
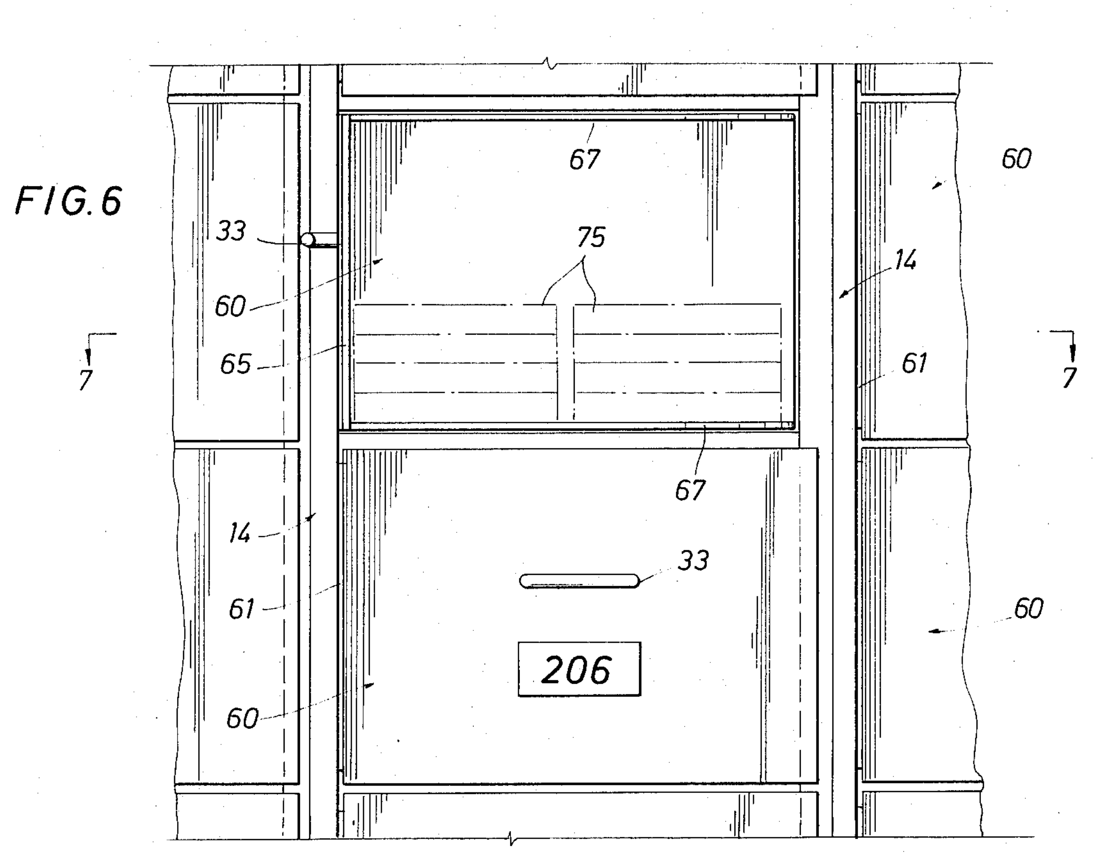
FIG. 6 is an elevation view of a modified form of the invention for use with disks.
Figure 7:
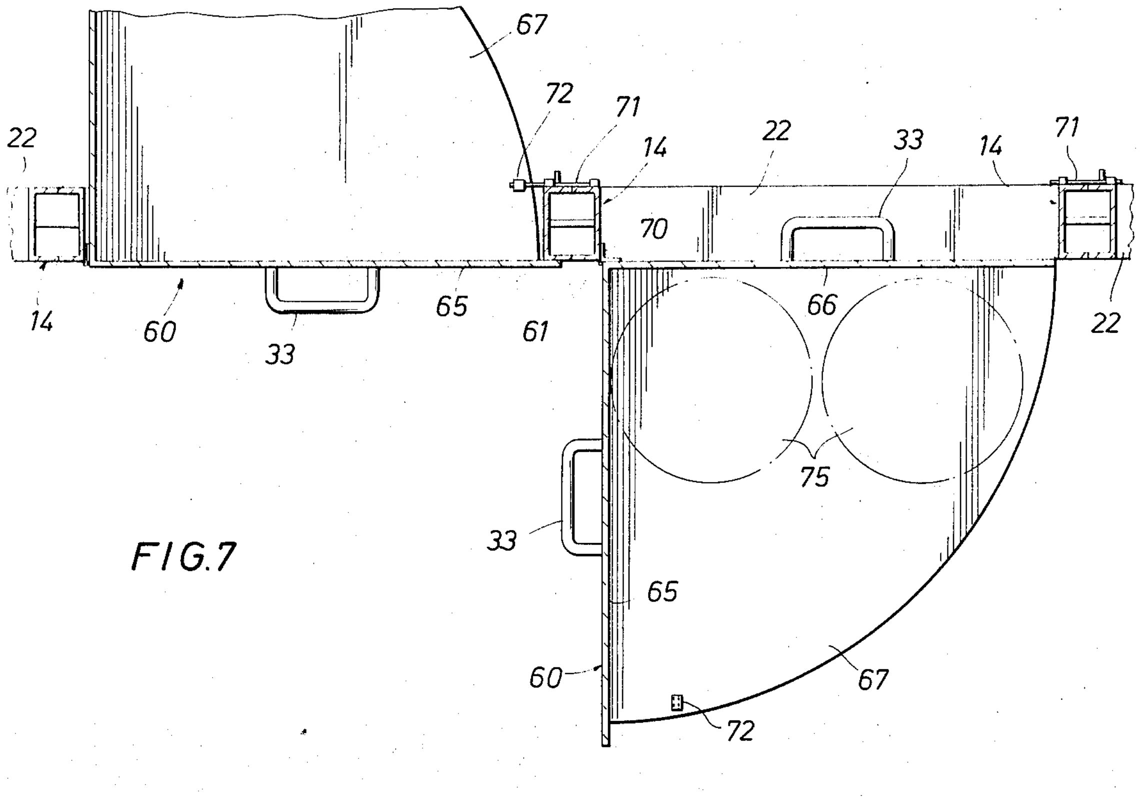
FIG. 7 is a plan view of the modified form of the invention shown in FIG. 6.

Referring to FIGS. 6 and 7, there is shown a modified form of the invention suitable for dispensing magnetic storage disks. The staging bins in the modified form are hinged along a vertical axis so that the magnetic disks may be placed horizontally in the bins. The modified form of the invention utilizes the same vertical posts 14 and headers 22 described above. The modified staging bins 60 are hinged along their vertical axis 61 as shown in FIG. 6. The upper bin is shown in the open position while the lower bin is closed.

As shown in FIG. 7 each of the bins 60 has a front wall 65 and a side wall 66 that are joined at their adjacent edges. The bins can be formed from a single sheet of material that is bent at right angle along the vertical axis 61. Top and bottom plates 67 are fastened to the front and side walls by welding or the like to complete the staging bin. The top plate is omitted in FIG. 7 for clarity. The bins are supported on the vertical post members 14 by continuous hinges 70. One flap of the hinge being secured to the vertical post, the other flap being secured to the side wall of the bin. A locking means 71 comprising a slideable latch which engages a cooperating latch plate 72 on the front wall is provided for locking the bins when they are not in use. A plurality of magnetic disks 75 are shown stacked in the staging bins.

The modified staging bins can be formed of the same materials used for the embodiment shown in FIGS. 1-5. For example, the bins, vertical post and headers may be formed of sheet metal joined by spot welding or similar means. Also the bins may be assembled to form a wall of the library as shown in FIGS. 1 and 2. Likewise the bins and associated members may be insulated so that the wall forms a fire wall for isolating the library from the remainder of the computer facility. Of course it is possible to combine the staging bins illustrated in FIGS. 1–5 with those of FIGS. 6–7 in the same wall so that both magnetic tapes and disks may be dispensed from the same library. This can be accomplished by making the bins the same overall dimension and hinging them on the proper axis.

From the above description it is seen that the present invention provides a plurality of staging bins assembled in the form of individual vertical units. Any number of vertical units may be joined together in a side-by-side relationship to form a portion of a wall of a tape disk library. In addition the staging bins provide a means by which the individual computer tapes or disks may be dispensed to the users while retaining the overall security of the library. Additional security is provided by the locking means which permits the locking of the individual staging bins while permitting selected staging bins to be used by the operators.

I claim as my invention:

1. A staging bin system for dispensing computer tapes and disks from a storage area while controlling operator access to the storage area, said system comprising:

a pair of spaced parallel vertical post members;

a plurality of horizontal header members, said header members being attached at opposite ends to said pair of post members, said header members in addition being vertically spaced to form with said post members a plurality of rectangular shaped openings, said combination of post and header members being disposed to form a portion of a wall of the storage area;

a plurality of bin members, each bin member being formed by a front panel and a bottom panel disposed at an angle to each other and joined at their abutting edges, said front and bottom panels having a side-to-side dimension substantially equal to the spacing of said vertical members, a pair of side walls having edges joined to the ends of said front and bottom panels, said front panel in addition being substantially the same shape as said rectangular opening and said bottom panel has a front-to-back dimension greater than the height of said opening;

one of said bin members being hingeably attached to each of said header members adjacent the junction of the edges of said front and bottom panels, said bin members being movable between a closed position where said front panel closes said rectangular opening and tapes and disks may be placed in said bins from the storage side of said wall and an open position where tapes and disks placed in the bin may be removed by an operator from outside the storage area and the free edge of said bottom panel engages one of said header members to limit the movement of said bin member; and securing means disposed to permit selective securing from the storage area side of individual bins to prevent an operator opening them from the outside of said storage area.

2. The staging bin system of claim 1 wherein sufficient vertical posts are provided to form in combination with said bins the wall of said storage area.

3. The staging bin system of claim 1 wherein said bins close a portion of the space between the vertical posts and the remainder of the space is enclosed by panel members, said panel members being attached to said vertical post members.

4. The staging bin system of claim 1 wherein the unsupported edge of each side wall has an arcuate shape with the center of the arc being located at the intersection of said front and bottom panels.

5. A staging bin system for dispensing computer tapes and disks from a storage area while limiting operator access to the storage area, said system comprising:

a pair of spaced parallel vertical post members;

a plurality of horizontal header members, said header members being attached at opposite ends to said pair of post members, said header members in addition being vertically spaced to form with said post members a plurality of rectangular shaped openings, said combination of post and header members being disposed to form a portion of a wall of the storage area;

a plurality of bin members, each bin member being formed by a pair of panels disposed at an angle to each other and joined at their adjacent edges, a pair of wall members having edges joined to the ends of said pair of panels, one of said pair of panels in addition being substantially the same shape as said rectangular opening;

one of said bin members being hingeably attached to one side of said rectangular opening adjacent the joined edges of said pair of panels, said bin members being movable between a closed position where said one panel closes said rectangular opening and an open position where tapes and disks placed in the bin may be removed; and securing means disposed to permit selective securing of individual bins to prevent an operator opening them from the outside of said storage area.

6. The staging bin system of claim 5 wherein sufficient vertical posts are provided to form in combination with said bins the wall of the storage area.

7. The staging bin system of claim 5 wherein said bins close a portion of the space between the vertical posts and the remainder of the space is enclosed by panel members, said panel members being attached to said vertical post members.

8. The staging bin system of claim 5 wherein the unsupported edge of each wall member has an arcuate shape with the center of the arc being located at the intersection of said pair panels.

9. The staging bin system of claim 8 wherein said pair of panels form the front and one side wall of the staging bin and said pair of wall members from the top and bottom walls of said staging bin.

10. The staging bin system of claim 9 wherein said staging bin is hingeably attached to said vertical post member to pivot about a vertical axis.

* * * * *